United States Patent
Leonard et al.

(10) Patent No.: US 10,562,391 B2
(45) Date of Patent: Feb. 18, 2020

(54) ASSEMBLY WITH IMPROVED SYSTEM FOR ATTACHING A COMPONENT TO A CONTAINER

(71) Applicant: Plastic Omnium Advanced Innovation and Research, Brussels (BE)

(72) Inventors: Stephane Leonard, Brussels (BE); Frederic Guignery, Mery-sur-Oise (FR); Benjamin Janssen, Taverny (FR)

(73) Assignee: Plastic Omnium Advanced Innovation and Research, Brussels (BE)

( * ) Notice: Subject to any disclaimer, the term of this patent is extended or adjusted under 35 U.S.C. 154(b) by 476 days.

(21) Appl. No.: 14/950,444

(22) Filed: Nov. 24, 2015

(65) Prior Publication Data
US 2016/0152379 A1   Jun. 2, 2016

(30) Foreign Application Priority Data

Nov. 27, 2014   (EP) .................................... 14195268

(51) Int. Cl.
*B60K 15/067*   (2006.01)
*B60K 15/03*    (2006.01)
*B65D 25/20*    (2006.01)

(52) U.S. Cl.
CPC ............ *B60K 15/067* (2013.01); *B60K 15/03* (2013.01); *B65D 25/20* (2013.01); *B60K 2015/0319* (2013.01); *B60K 2015/03421* (2013.01); *B60K 2015/03467* (2013.01); *B60K 2015/03493* (2013.01)

(58) Field of Classification Search
CPC .. B65D 25/20; B60K 15/03; B60K 15/03177; B60K 2015/03453; B60K 2015/03467
See application file for complete search history.

(56) References Cited

U.S. PATENT DOCUMENTS

| 5,102,172 A | * | 4/1992 | Seizert ................... B60K 15/01 |
| | | | 220/298 |
| 5,207,463 A | | 5/1993 | Seizert et al. |

(Continued)

FOREIGN PATENT DOCUMENTS

| DE | 101 29 245 A1 | 5/2002 |
| EP | 2 746 548 A1 | 6/2014 |
| JP | 2010-275983 | 12/2010 |

OTHER PUBLICATIONS

European Search Report dated May 7, 2015 in European Application 14195268, filed Nov. 27, 2014 (with Written Opinion).

*Primary Examiner* — Steven A. Reynolds
*Assistant Examiner* — Javier A Pagan
(74) *Attorney, Agent, or Firm* — Oblon, McClelland, Maier & Neustadt, L.L.P.

(57) ABSTRACT

An assembly including a plastic container and a component attached to the container with an attachment system, the container having a circular attachment portion. The attachment system includes a ring shaped member including a top flange, a bottom flange and a frustoconical side wall connecting the top flange and the bottom flange, the bottom flange and a portion of the frustoconical side wall being embedded in the attachment portion, the ring shaped member further comprising peripheral tabs; a plurality of engaging claw parts, each engaging claw part being configured to engage a peripheral tab and to press the component against the attachment portion.

13 Claims, 4 Drawing Sheets

(56) References Cited

U.S. PATENT DOCUMENTS

Figure 1:
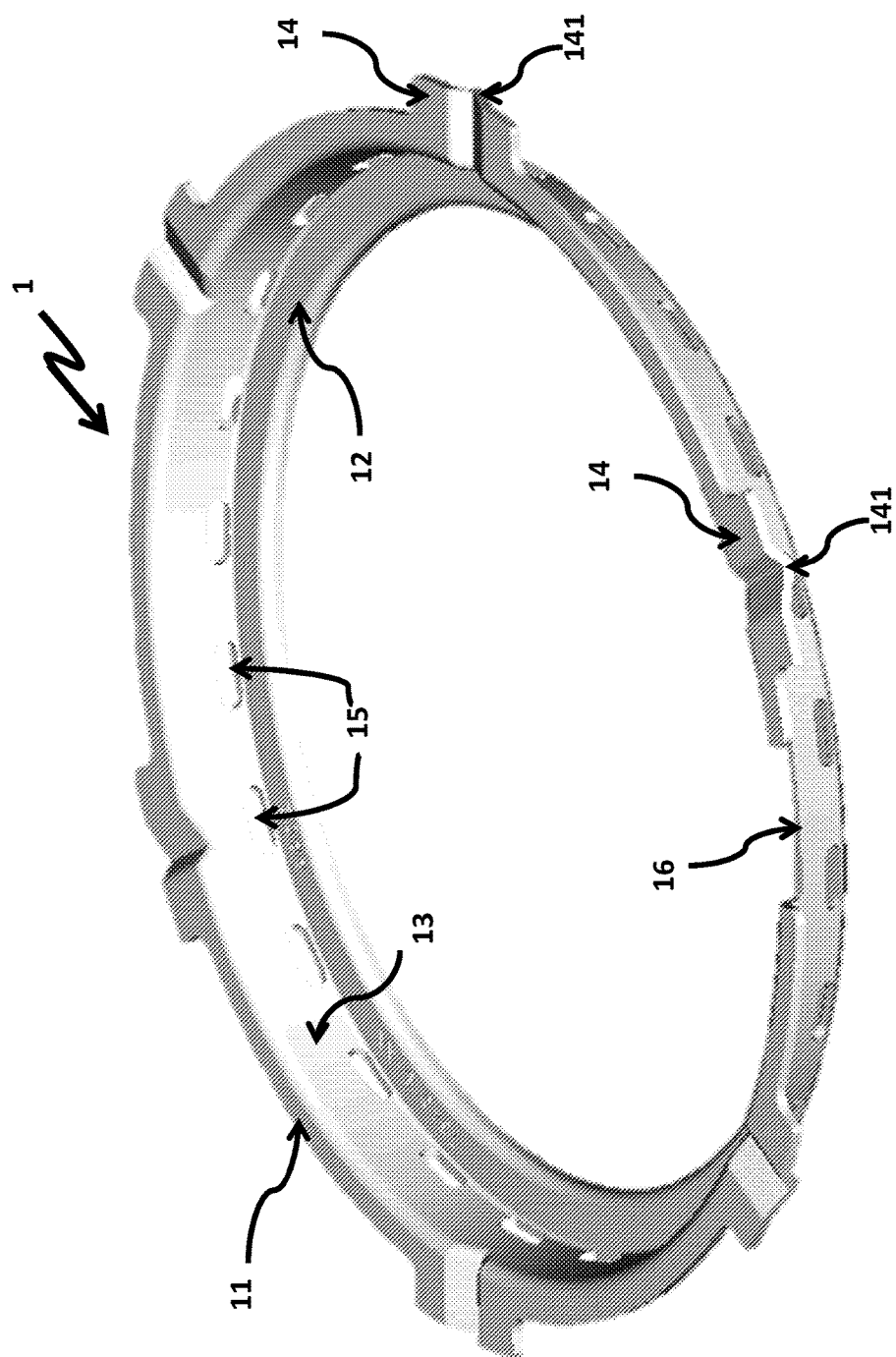

| | | | | |
|---|---|---|---|---|
| 5,405,040 A | * | 4/1995 | Keller | B60K 15/0406 |
| | | | | 220/203.1 |
| 6,533,288 B1 | * | 3/2003 | Brandner | B60K 15/03 |
| | | | | 220/304 |
| 7,341,047 B2 | * | 3/2008 | Sone | F02M 37/103 |
| | | | | 123/495 |
| 8,556,109 B2 | | 10/2013 | Fujita | |
| 2001/0042752 A1 | * | 11/2001 | Pachciarz | B60K 15/03 |
| | | | | 220/562 |
| 2004/0231730 A1 | * | 11/2004 | Nakamura | B60K 15/03 |
| | | | | 137/565.16 |
| 2005/0194796 A1 | * | 9/2005 | Powell | F02M 37/103 |
| | | | | 292/256 |
| 2008/0210692 A1 | * | 9/2008 | Fujita | B29C 49/20 |
| | | | | 220/562 |
| 2010/0051621 A1 | * | 3/2010 | Shimoda | B60K 15/0406 |
| | | | | 220/300 |
| 2012/0187131 A1 | * | 7/2012 | Claucherty | B60K 15/03 |
| | | | | 220/562 |
| 2014/0312613 A1 | * | 10/2014 | Gaffi Eld | B60K 15/03 |
| | | | | 285/308 |

* cited by examiner

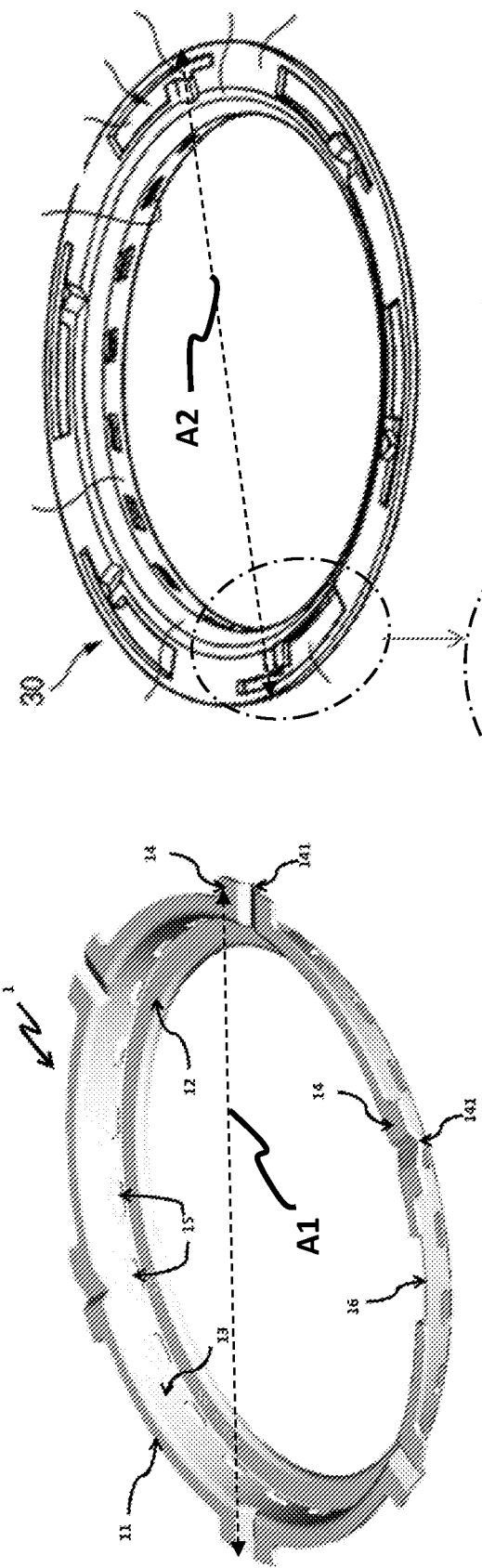
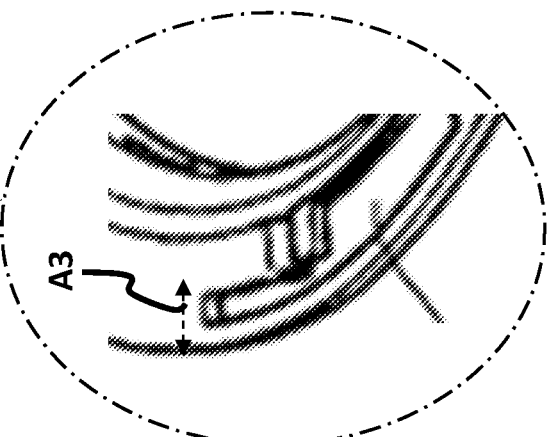
Figure 4a
Figure 4b
Figure 4c

ASSEMBLY WITH IMPROVED SYSTEM FOR ATTACHING A COMPONENT TO A CONTAINER

The present invention relates to an assembly comprising a container and a component attached to the container. More precisely, it relates to a system for attaching a component to a container, such as for example a fuel tank or a urea tank which is provided in a motor vehicle (i.e. passenger car, truck, etc.).

Liquid and gas tanks carried on board vehicles generally have to satisfy sealing and permeability standards related to the type of use for which they are designed and the requirements in terms of environmental considerations that they have to meet.

Incorporating components into such tanks presents the problem of attaching them in a sealed and impermeable way to an opening made in these tanks. In addition, it is also desirable that the component be mounted to the tank so as to be removable for service and repair purposes.

Various techniques for attaching a component to a tank are already known. For example, U.S. Pat. No. 8,556,109 teaches mechanically attaching a component to a fuel tank by means of a lock ring being embedded in the tank wall and a lock plate comprising a plurality of engaging claw parts configured to engage with the lock ring. However, the design of the lock ring is relatively complex. Indeed, the lock ring requires a plurality of lock holes each including a wide width portion and a narrow width portion. Further, in order to ensure seal performance, it is required to form a sealing region on the edge of a stepped portion of the lock ring. This operation is complex and delicate, in particular when the tank is formed by injection molding.

In view of the above, there is a need for an assembly with an improved attachment system which has a simple and robust design and which is easy to use, in particular when the tank is formed by injection molding.

According to an aspect of the present invention there is provided an assembly comprising a plastic container and a component attached to the container by means of an attachment system, the container having a circular attachment portion, said component being attached on said attachment portion. The attachment system is such that it comprises:
 a ring shaped member comprising a top flange, a bottom flange and a frustoconical side wall connecting the top flange and the bottom flange, the bottom flange and a portion of the frustoconical side wall being embedded in said attachment portion, the ring shaped member further comprising a plurality of peripheral tabs extending outwardly from the top flange;
 a plurality of engaging claw parts, each engaging claw part being configured to engage one of said plurality of peripheral tabs and to press said component against said attachment portion.

Such an arrangement will result in a secure attachment of the component to the container. More precisely, the component is fastened and tightly pressed against the circular attachment portion of the container when the engaging claw parts engage with the tabs of the ring shaped member of the present invention. Such engaging operation can either be performed manually by an operator or automatically by a machine.

In comparison with the lock ring of the prior art discussed above, the ring shaped member of the present invention does not have any lock holes. Instead, the ring shaped member of the present invention comprises protruding tabs. Such tabs are easy to form. Therefore, in a particular embodiment, the ring shaped member of the present invention can be made from plastic. For example, it can be obtained by injection molding. In another particular embodiment, the ring shaped member of the present invention can be made of metal. In addition, the ring shaped member of the present invention is robust, in the sense that the peripheral tabs can keep substantially the same shape after several mounting/dismounting operations. It has been noted that with a lock ring of the type discussed above in relation to U.S. Pat. No. 8,556,109 the lock holes may tend to become distorted after several mounting/dismounting operations. Indeed the edge portions of the lock ring that extend around the lock holes can be damaged or bended such that the engaging claw parts and the lock holes cannot be slotted together, or such that the shape of the lock holes gets wider. The latter situation can result in weak attachments and leak problems. In other words, with the attachment system according to the present invention the accuracy and repeatability of the mounting/dismounting operations can be improved. Further, as it will be described hereafter with reference to FIGS. 4a-4c the attachment system according to the present invention is compact.

Advantageously, the container is made from plastic.

The term "plastic" is understood to mean any synthetic polymeric material, whether thermoplastic or thermosetting, which is in the solid state under ambient conditions, as well as blends of at least two of these materials. The intended polymers comprise both homopolymers and copolymers (especially binary or ternary copolymers). Examples of such copolymers are, non-limitingly: random copolymers, linear block copolymers, other block copolymers, and grafted copolymers. Thermoplastic polymers, including thermoplastic elastomers, and blends thereof, are preferred. In particular, the container may be made of polyolefins, grafted polyolefins, thermoplastic polyesters, polyketones, polyamides and copolymers thereof. High-density polyethylene (HDPE) can be used.

The container can have a thermoplastic monolayer structure or a thermoplastic multilayer structure.

In a particular embodiment, the container can be manufactured by the blow molding method.

Alternatively, the container can be manufactured by forming an upper shell and a lower shell separately by the injection molding method, and welding them together.

It will be appreciated that sealing region(s) can be easily formed around the frustoconical side wall whichever molding method is used.

In a preferred embodiment, the frustoconical side wall comprises at least one through-hole and the plastic material of the container fills and extends on both sides of the through-hole(s). Due to the presence of at least one through-hole, a strong interlocking between the ring shaped member and the circular attachment portion is obtained.

Advantageously and nonlimitingly, the component may be chosen from a nipple, an end piece, a neck, a valve module, a pump module or a baseplate supporting components (pump, gauge, sensors, swirl pot, heater etc.).

According to a first particular embodiment, the component comprises the plurality of engaging claw parts. In other words, the engaging claw parts are overmolded or formed in one piece with the component main body.

According to a second particular embodiment, the attachment system comprises an annular lock plate comprising the plurality of engaging claw parts. In this second particular embodiment, the annular lock plate and the component are two distinct pieces. For example, the component can be mounted onto the circular attachment portion and the annular lock plate can pass over it afterwards in order to reach and engage the peripheral tabs of the ring shaped member. Alternatively, the annular lock plate can be pre-mounted on the component and then this sub-assembly is fixed to the circular attachment portion by engaging the engaging claw parts with the peripheral tabs of the ring shaped member.

In an advantageous embodiment, the annular lock plate comprises at least one peripheral extension part. For example, such peripheral extension part(s) can be dimensioned and shaped such that external element(s) can be fixed thereon. For example, such peripheral extension part(s) can be configured to cooperate with an external tool or machine.

In a preferred embodiment, the attachment portion includes a circular groove and a sealing ring is arranged in the groove. The sealing ring is clamped between the component and the attachment portion when the engaging claw parts engage with the tabs of the ring shaped member. Therefore, a secure and sealable connection can be ensured.

In a particular embodiment, the container is an ammonia precursor tank for a motor vehicle. Preferably, the ammonia precursor is an aqueous urea solution.

In another particular embodiment, the container is a fuel tank for a motor vehicle.

In yet another particular embodiment, the container is a tank for storing a solid absorbing matrix.

The present invention is illustrated in a non limitative way by the examples below relying on FIGS. 1, 2, 3 and 4a to 4c attached. In these figures, identical or similar elements bear identical reference numbers.

FIG. 1 is a CAD-drawing representing a ring shaped member according to a particular embodiment of the present invention.

As illustrated in the example of FIG. 1, the ring shaped member (1) comprises a top flange (11), a bottom flange (12) and a frustoconical side wall (13) connecting the top flange and the bottom flange. The ring shaped member (1) further comprises peripheral tabs (14) extending outwardly from the top flange (11). In this particular embodiment, the ring shaped member (1) comprises six peripheral tabs (14) regularly spaced along the top flange (11). In an advantageous embodiment, each peripheral tab (14) can be equipped with a tooth or a series of teeth. In the example of FIG. 1, each peripheral tab (14) is equipped with a tooth (141) having a V-shape profile. Advantageously, the frustoconical side wall (13) comprises a plurality of through-holes (15). In this particular embodiment, the top flange (11) comprises a recess (16) which is used as a point of reference for precisely positioning a component with respect to the ring shaped member (1). In this example, the ring shaped member (1) is made of metal.

Figure 2:
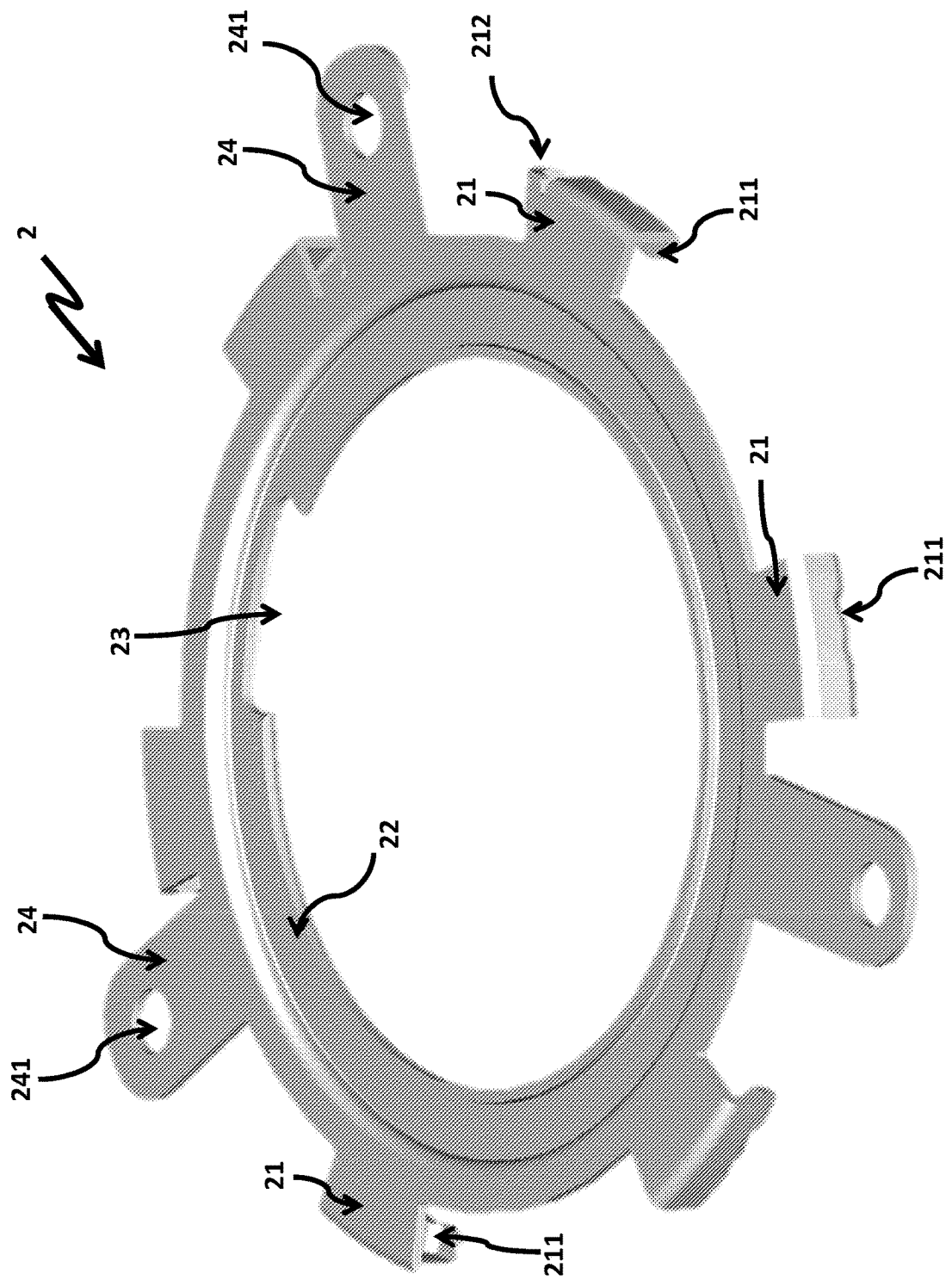

FIG. 2 is a CAD-drawing representing an annular lock plate according to a particular embodiment of the present invention.

As illustrated in the example of FIG. 2, the annular lock plate (2) comprises six engaging claw parts (21). Each engaging claw part has a teethed portion (211) adapted to engage with one of the tooth (141) illustrated in FIG. 1. At least one of the engaging claws comprise a stopper (212) which is used to block the rotation of the engaging claws once the teeth are matching with the corresponding teeth of the ring shaped member. The annular lock plate (2) comprises a flat portion (22) adapted to contact with a part of the component. In this particular embodiment, the flat portion (22) comprises a recess (23) which is used as a point of reference for precisely positioning the annular lock plate (2) with respect to the component. The annular lock plate (2) can optionally comprise one or several peripheral extension part(s). In this particular embodiment, the annular lock plate (2) comprises three extensions (24). Each extension is provided with an orifice (241). These orifices can be used to attach, for example, a protection plate, some clips for hydraulic lines or wiring harnesses. Thus, these extensions (241) can advantageously be used as fixation points. In this example, the annular lock plate (2) is made of metal.

In an alternative embodiment (not illustrated), the annular lock plate (2) can be replaced by six independent engaging claw parts. In this alternative embodiment, each independent engaging claw part comprises a teethed portion adapted to engage a peripheral tab of the ring shaped member and a flat portion adapted to press a part of the component against the attachment portion.

Figure 3:
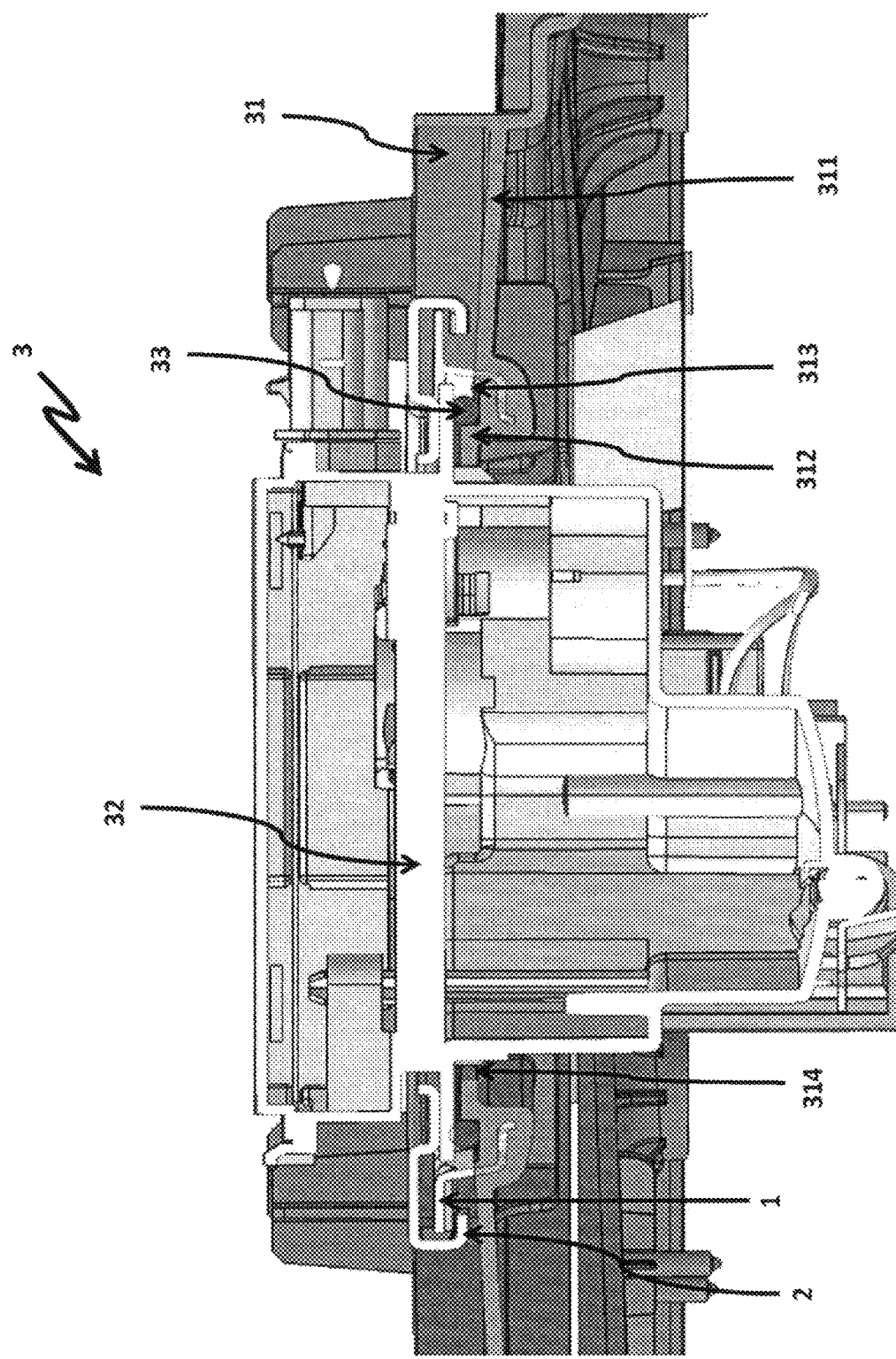

FIG. 3 is a CAD-drawing representing a partial cross-section of an assembly according to a particular embodiment of the present invention.

The assembly (3) comprises a plastic container (31), the ring shaped member (1) of FIG. 1 and the annular lock plate (2) of FIG. 2.

The plastic container (31) has a wall portion (311) and a circular attachment portion (312) projecting outward from said wall portion. In this example, the wall portion (311) and the circular attachment portion (312) are formed simultaneously by injection molding. As illustrated, the bottom flange and a portion of the frustoconical side wall of the ring shaped member (1) are embedded (i.e. overmolded) in the attachment portion (312). The attachment portion (312) defines an opening (314) in the wall portion of the tank. The assembly further comprises a component (32) which is attached to the attachment portion (312) by means of the ring shaped member (1) and the annular lock plate (2). The attachment portion (312) comprises a groove (313). An O ring seal (33) is arranged in the groove (313). The groove (313) is arranged such that the O ring seal is positioned in-between the component and the bottom flange. In FIG. 3, the ring shaped member (1) and the annular lock plate (2) are in a final closing position. In this final closing position, the engaging claw parts of the annular lock plate are engaged with the peripheral tabs of the ring shaped member. Accordingly, the component (32) is tightly pressed towards the attachment portion (312). The O ring seal (33) is compressed axially between the attachment portion (312) and the component (32). In this example, the container (31) is a urea tank and the component (32) is a baseplate which incorporates and/or supports at least one active component such as, for example, a pump, a filter, a level sensor, a quality sensor, a temperature sensor or a heater. A part of this baseplate is positioned through the opening (314).

In FIGS. 4a to 4c it can be seen that, for a given size of component to be attached, the external volume of the ring shaped member (1) according to the present invention is lower than the external volume of the lock ring (30) disclosed in document U.S. Pat. No. 8,556,109. Indeed the overall diameter of the ring shaped member (1) of the present invention, schematically represented by the dotted arrow (A1) in FIG. 4a, is shorter than the overall diameter of the lock ring (30) disclosed in document U.S. Pat. No. 8,556,109, schematically represented by the dotted arrow (A2) in FIG. 4b. The difference of diameter between the diameters A1 and A2 is represented by the dotted arrow (A3) in FIG. 4c.

The invention claimed is:

1. An assembly comprising a plastic container and a component attached to the container with an attachment system, the container having a circular attachment portion, said component being attached on said attachment portion, wherein the attachment system comprises:
- a ring shaped member comprising a top flange, a bottom flange and a frustoconical side wall connecting the top flange and the bottom flange, the bottom flange and a portion of the frustoconical side wall being embedded in said attachment portion, the ring shaped member further comprising a plurality of peripheral tabs extending outwardly from the top flange;
- a plurality of engaging claw parts, each engaging claw part being configured to engage one of said plurality of peripheral tabs and to press said component against said attachment portion, wherein the component comprises said plurality of engaging claw parts and wherein the engaging claw parts are overmolded or formed in one piece with a main body of the component.

2. The assembly according to claim 1, wherein the frustoconical side wall comprises at least one through-hole.

3. The assembly according to claim 1, wherein said attachment portion includes a circular groove and a sealing ring is arranged in the groove.

4. The assembly according to claim 1, wherein the container is an ammonia precursor tank for a motor vehicle.

5. The assembly according to claim 1, wherein the container is a fuel tank for a motor vehicle.

6. The assembly according to claim 1, wherein the container is a tank for storing a solid absorbing matrix.

7. An assembly comprising a plastic container and a component attached to the container with an attachment system, the container having a circular attachment portion, said component being attached on said attachment portion, wherein the attachment system comprises:
- a ring shaped member comprising a top flange, a bottom flange and a frustoconical side wall connecting the top flange and the bottom flange, the bottom flange and a portion of the frustoconical side wall being embedded in said attachment portion, the ring shaped member further comprising a plurality of peripheral tabs extending outwardly from the top flange;
- a plurality of engaging claw parts, each engaging claw pan being configured to engage one of said plurality of peripheral tabs and to press said component against said attachment portion, wherein the attachment system comprises an annular lock plate comprising the plurality of engaging claw parts, the component and the annular lock plate being two different pieces.

8. The assembly according to claim 7, wherein the frustoconical side wall comprises at least one through-hole.

9. The assembly according to claim 7, wherein said annular lock plate comprises at least one peripheral extension part.

10. The assembly according to claim 7, wherein said attachment portion includes a circular groove and a sealing ring is arranged in the groove.

11. The assembly according to claim 7, wherein the container is an ammonia precursor tank for a motor vehicle.

12. The assembly according to claim 7, wherein the container is a fuel tank for a motor vehicle.

13. The assembly according to claim 7, wherein the container is a tank for storing a solid absorbing matrix.

* * * * *